Patented June 29, 1954

2,682,336

UNITED STATES PATENT OFFICE 2,682,336

RUBBER SWELLING ADDITIVES FOR FUELS

Charles W. Moberly, Bartlesville, Okla., assignor to Phillips Petroleum Company, a corporation of Delaware No Drawing. Application January 4, 1950, Serial No. 136,845

20 Claims. (Cl. 206—84)

This invention relates to fuel compositions having improved rubber swelling properties. In some aspects the invention pertains to the use of compounds of a certain type as swelling agents for synthetic rubber gaskets, fuel tank liners, and other aircraft parts which are desired to swell slightly on contact with hydrocarbon fuels in order to prevent or minimize leakage of fuel from the system.

In aircraft, where rubber parts such as tank linings and gaskets come in contact with aviation fuels, it is desirable that the fuels possess moderate swelling characteristics in order to keep joints and closures tightly sealed to prevent leaks. The same is sometimes true with fuel systems of other types, for example in land vehicles. This desired swelling has usually been accomplished by the presence of about 10 per cent aromatic hydrocarbons in the fuel.

However, in some instances a supply of aromatics may not be available for blending purposes and yet it is desired that the fuel have moderate rubber swelling characteristics. In other instances it is desirable to provide fuels for purposes other than aviation. In such applications the presence of aromatics is often not required and yet it is preferred that the fuel have moderate rubber swelling characteristics.

An object of this invention is to supply new rubber swelling additives for fuels. Another object is to provide fuel compositions having improved rubber swelling characteristics. A further object is to provide improved methods of operating a fuel system having gaskets, tank linings, or other sealing parts made of rubbery compositions. Yet another object is to provide an improved package comprising a rubber-lined fuel tank containing a hydrocarbon fuel and a rubber swelling agent. A still further object is to provide a fuel containing insufficient aromatic hydrocarbons to provide required rubber swell characteristics yet having said required characteristics. Further objects and advantages of the invention will become apparent, to those skilled in the art, from the accompanying disclosure and discussion.

I have now discovered a novel class of compounds, namely, aromatic-nucleus-containing nitriles, which are useful as rubber swelling agents when added to fuels for internal combustion engines in small amounts. The compounds of the present invention are represented by the general formula RCN wherein R is an aryl, alkaryl, cycloalkylaryl, aralkyl or arylcycloalkyl group. Said R group preferably contains not to exceed twenty carbon atoms. The aryl group preferably contains a benzene or a naphthalene nucleus, although it may instead or additionally contain other aromatic nuclei. Examples of compounds of the present invention which are useful for this purpose includes benzonitrile, o-methylbenzonitrile, phenylacetonitrile, 2-methylbenzenecarbonitrile (o-tolunitrile), 4-methylbenzenecarbonitrile (p-tolunitrile), α-phenylpropionitrile, (3-ethylphenyl)-acetonitrile, γ-phenylbutyronitrile, 2-phenyldodecanenitrile, naphthylnitrile, alpha-methylnaphthylnitrile, cyclohexylbenzonitrile, diphenylacetonitrile, 3-phenylcyclohexylnitrile, and all others coming within the scope of said general formula, which can readily be named by those skilled in the art.

The compounds of the present invention are used for their intended purpose in small amounts, usually in the range from 0.1 to 5.0, preferably 0.5 to 2.0 per cent by weight of the fuel to which added. It is an advantage of my novel additives that they are much more effective rubber swelling agents than are aromatic hydrocarbons as employed in the prior art. For example, the percentage swell provided by the present additives is often three times as great as that provided by the same amount of an aromatic hydrocarbon.

Fuels to which the compounds of the present invention may be added include reciprocating aircraft engine fuels, jet aircraft fuels, tank fuels, and in fact any hydrocarbon fuels which are to be used in systems having rubber-like components which it is desired to swell to a limited extent. Such fuels ordinarily are normally liquid and ordinarily boil within the gasoline or kerosene ranges, preferably the former. Those to which my invention is most often applied are solely or largely paraffinic, the remaining constituents being cycloparaffinic (naphthenic), and/or aliphatic and alicyclic olefins. My invention also improves fuels containing aromatic hydrocarbons when it is desired to improve the nuclear swelling characteristics thereof. It will be appreciated that the operation of fuel systems with fuels containing one or more of my additives will be greatly improved over operation with the same fuels not containing my additives. Bullet-proof gasoline tanks containing fuels which have had one or more of my additives incorporated therein will be tighter to leaks than otherwise.

Rubbers which are swelled when contacted by fuels containing the compounds of the present invention include vulcanizates of smoked sheet, Buna-S, GR-S, GR-M, neoprene, and especially Hycar OR 15 and 25 and Perbunan. Some of the aforementioned rubbers are swelled to a greater or lesser amount than others depending upon their compositions and swelling properties, and the conditions under which they are contacted with the fuels. The additives disclosed herein appear to provide greatest swelling effects on butadiene-nitrile type copolymers. Definitions for the above-mentioned rubbers may be found in "The Condensed Chemical Dictionary," Reinhold Publishing Corporation, third edition, 1942, and in the "Handbook of Material Trade Names" by Zimmerman, et al., Industrial Research Service, 1946. A preferred form of the invention involves use of my additives in fuels in contact with rubbery polymeric materials in which a monomer thereof contains a nitrile group. Examples of such monomers are acrylonitrile, methacrylonitrile, butenylnitrile, etc., and they may be copolymerized with 1,3-butadiene, other conjugated diolefins, or other unsaturated compounds forming polymerizates having rubbery characteristics. Such polymeric materials are referred to herein as nitrile-type rubbers.

The following data are presented as examples of the action of certain of my additives on certain rubbers under standard rubber-swell test conditions. The data are merely illustrative and are thus not coextensive with my invention in its broadest aspects as described hereinabove.

*Example I*

Vulcanized Perbunan 26 synthetic rubber compounded according to the following recipe was used as a test material:

| | Parts |
|---|---|
| "Perbunan 26"* (base polymer) | 100 |
| Sulfur | 1.5 |
| "Altax" (benzothiazole disulfide) | 1.5 |
| Stearic acid | 1.5 |
| Zinc oxide | 1.5 |
| "Philblack A"** (carbon black) | 60 |

* Monomer charge ratio of 26 parts by weight acrylonitrile to 74 parts by weight butadiene, copolymerized in aqueous emulsion system.
** Trade-mark.

The swelling tests were made in accordance with the procedure described in ASTM D471–43T. Briefly described, this procedure measures volume increase, the volume of a rubber sample before and after the test being determined by differential weights in air and in water.

Solutions of the additives were made in pure isooctane (2,2,4-trimethylpentane).

The swelling produced by the isooctane under the same conditions was used as a reference test. All tests were performed in a constant temperature bath operating at 30° C.

Results of tests using phenylacetonitrile and benzonitrile as additives are recorded below:

| Compound | Concentration percent (in isooctane) | Percent Swell | Increase in Percent Swell over Isooctane |
|---|---|---|---|
| Phenylacetonitrile | 1.0 | 19.3 | 14.5 |
| Benzonitrile | 1.0 | 14.8 | 10.0 |
| Isooctane | 100.0 | 4.8 | |

*Example II*

Tests were run according to the method of Example I to demonstrate the superiority of the compounds of the present invention over aromatic hydrocarbons as rubber swelling agents. Results of tests using benzonitrile and benzene are recorded below:

| Compound | Concentration percent (in isooctane) | Percent Swell | Increase in Percent Swell over Isooctane |
|---|---|---|---|
| Benzonitrile | 3.0 | 30.1 | 25.3 |
| Benzene | 3.0 | 9.0 | 4.2 |
| Isooctane | 100.0 | 4.8 | |

I claim:
1. A fuel composition comprising a hydrocarbon fuel boiling within the gasoline-kerosene range having incorporated therein an aromatic-nucleus-containing nitrile having not in excess of 21 carbon atoms per molecule in an amount sufficient to improve the rubber swelling characteristics thereof, the portion of the molecule attached to the nitrile group being a hydrocarbon radical.

2. The fuel of claim 1 wherein said nitrile is phenylacetonitrile.

3. The fuel of claim 1 wherein said nitrile is benzonitrile.

4. A gasoline boiling-range paraffinic fuel containing from 0.1 to 5.0 weight per cent of an aromatic-nucleus-containing nitrile, the portion of the molecule attached to the nitrile group being a hydrocarbon radical having not in excess of 20 carbon atoms.

5. In the operation of a fuel system containing sealing elements comprising a nitrile-type synthetic rubber, the improvement which comprises utilizing in said system a liquid fuel containing a nitrile having an aromatic nucleus in its molecule and having not over 21 carbon atoms in its molecule in an amount between 0.5 and 2.0 weight per cent of the fuel sufficient to impart thereto adequate swelling properties towards said sealing elements, the portion of the molecule attached to the nitrile group being a hydrocarbon radical.

6. The improvement as defined in claim 5 wherein said nitrile is phenylacetonitrile.

7. The improvement as defined in claim 5 wherein said nitrile is benzonitrile.

8. An improved fuel package comprising a metallic tank lined with a sealing composition including a nitrile-type synthetic rubber and a liquid aviation fuel containing from 0.1 to 5.0 weight per cent of at least one aromatic nucleus-containing nitrile having not in excess of 21 carbon atoms per molecule sufficient to impart desired rubber-swelling properties to said fuel, the portion of the molecule attached to the nitrile group being a hydrocarbon radical.

9. The fuel package of claim 8 wherein said nitrile is phenyl-acetonitrile.

10. The fuel package of claim 8 wherein said nitrile is benzonitrile.

11. A paraffinic aviation fuel containing from 0.1 to 5.0 per cent of its weight of phenylacetonitrile.

12. A paraffinic aviation fuel containing from 0.1 to 5.0 per cent of its weight of benzonitrile.

13. A paraffinic aviation fuel containing from 0.1 to 5.0 per cent of its weight of alpha-methylnaphthylnitrile.

14. A vulcanized rubbery copolymer obtained by emulsion polymerization of a major portion of 1,3-butadiene and a minor portion of acrylonitrile, swelled by prolonged contact with a liquid hydrocarbon fuel containing from 0.1 to 5.0 weight per cent of an aromatic-nucleus-containing nitrile having not in excess of 21 carbon atoms per molecule.

15. A paraffinic aviation fuel containing from 0.1 to 5.0 per cent of its weight of naphthylnitrile.

16. A paraffinic aviation fuel containing from 0.1 to 5.0 per cent of its weight of phenylcyclohexylnitrile.

17. A fuel composition comprising a hydrocarbon fuel boiling within the gasoline range having incorporated therein, in an amount sufficient to improve the rubber swelling characteristics thereof, a compound represented by the formula RCN wherein R is selected from the group consisting of unsubstituted aryl, alkaryl, cycloalkylaryl, aralkyl, and arylcycloalkyl radicals having less than 21 carbon atoms.

18. A gasoline boiling range paraffinic fuel containing from 0.1 to 5.0 weight per cent of a compound represented by the formula RCN wherein R is selected from the group consisting of unsubstituted aryl, alkaryl, cycloalkylaryl, aralkyl, and arylcycloalkyl radicals having less than 21 carbon atoms.

19. In the operation of a fuel system containing sealing elements comprising a nitrile-type synthetic rubber, the improvement which comprises utilizing in said system a liquid fuel containing a compound having the formula RCN wherein R is selected from the group consisting of unsubstituted aryl, alkaryl, cycloalkylaryl, aralkyl, and arylcycloalkyl radicals having less than 21 carbon atoms in an amount between 0.5 and 2.0 weight per cent of the fuel sufficient to impart thereto adequate swelling properties towards said sealing elements.

20. An improved fuel package comprising a metallic tank lined with a sealing composition including a nitrile-type synthetic rubber and a liquid aviation fuel containing from 0.1 to 5.0 weight per cent of a compound represented by the formula RCN wherein R is selected from the group consisting of unsubstituted aryl, alkaryl, cycloalkylaryl, aralkyl, and arylcycloalkyl radicals having less than 21 carbon atoms.

References Cited in the file of this patent

UNITED STATES PATENTS

| Number | Name | Date |
|---|---|---|
| 1,856,186 | Hofmann et al. | May 3, 1932 |
| 2,134,306 | Lewis | Oct. 25, 1938 |
| 2,160,372 | Staerk | May 30, 1939 |
| 2,168,674 | Loane et al. | Aug. 8, 1939 |
| 2,366,179 | Chalkley | Jan. 2, 1945 |
| 2,377,989 | Brown | June 12, 1945 |
| 2,394,607 | Gray et al. | Feb. 12, 1946 |
| 2,461,349 | Ralston et al. | Feb. 8, 1949 |
| 2,520,735 | Ralston et al. | Aug. 29, 1950 |
| 2,534,297 | Putnam | Dec. 19, 1950 |

FOREIGN PATENTS

| Number | Country | Date |
|---|---|---|
| 295,362 | Italy | Apr. 19, 1932 |